(12) United States Patent
Clauson et al.

(10) Patent No.: US 10,598,047 B2
(45) Date of Patent: Mar. 24, 2020

(54) LOW-POWER BOWED ROTOR PREVENTION SYSTEM

(71) Applicant: United Technologies Corporation, Farmington, CT (US)

(72) Inventors: Jesse W. Clauson, Agawam, MA (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 377 days.

(21) Appl. No.: 15/444,942

(22) Filed: Feb. 28, 2017

(65) Prior Publication Data

US 2018/0355764 A1    Dec. 13, 2018

Related U.S. Application Data

(60) Provisional application No. 62/301,163, filed on Feb. 29, 2016.

(51) Int. Cl.
*F01D 25/36* (2006.01)
*F01D 19/00* (2006.01)
(Continued)

(52) U.S. Cl.
CPC .............. *F01D 25/36* (2013.01); *F01D 19/00* (2013.01); *F01D 21/00* (2013.01); *F01D 21/20* (2013.01);
(Continued)

(58) Field of Classification Search
CPC .. F02C 7/26; F02C 7/262; F02C 7/268; F02C 7/275; F02C 7/27; F02C 7/35; F02C 7/36;
(Continued)

(56) References Cited

U.S. PATENT DOCUMENTS

| | | |
|---|---|---|
| 1,951,875 A | 3/1934 | Laabs |
| 2,617,253 A | 11/1952 | Fusner et al. |

(Continued)

FOREIGN PATENT DOCUMENTS

| | | |
|---|---|---|
| EP | 2305986 | 4/2011 |
| EP | 3211184 | 8/2017 |

(Continued)

OTHER PUBLICATIONS

EP Application No. 17176233.9 Extended EP Search Report dated Dec. 7, 2017, 9 pages.
(Continued)

*Primary Examiner* — Lorne E Meade
*Assistant Examiner* — Stephanie Cheng
(74) *Attorney, Agent, or Firm* — Cantor Colburn LLP

(57) ABSTRACT

A bowed rotor prevention system for a gas turbine engine includes a core turning motor operable to drive rotation of an engine core of the gas turbine engine. The bowed rotor prevention system also includes an auxiliary electric motor control operable to control the core turning motor to drive rotation of the engine core using electric power while a full authority digital engine control that controls operation of the gas turbine engine is either depowered or in a power state that is less than a power level used by the full authority digital engine control in flight operation.

18 Claims, 4 Drawing Sheets

(51) Int. Cl.
*F01D 21/00* (2006.01)
*F02C 7/275* (2006.01)
*F02C 7/277* (2006.01)
*F01D 21/20* (2006.01)
*F02C 7/32* (2006.01)

(52) U.S. Cl.
CPC .............. *F02C 7/275* (2013.01); *F02C 7/277* (2013.01); *F02C 7/32* (2013.01); *F05D 2220/323* (2013.01); *F05D 2260/4031* (2013.01); *F05D 2260/85* (2013.01)

(58) Field of Classification Search
CPC .... F02C 7/32; F05D 2260/85; F05D 2260/40; F05D 2260/4023; F05D 2260/403; F05D 2260/4031; F05D 2260/40311; F01D 19/00; F01D 21/00; F01D 21/06; F01D 25/34; F01D 25/36
See application file for complete search history.

(56) References Cited

U.S. PATENT DOCUMENTS

| | | | |
|---|---|---|---|
| 2,962,597 A | 11/1960 | Evans | |
| 3,057,155 A | 10/1962 | Rizk | |
| 3,151,452 A | 10/1964 | Bunger et al. | |
| 3,764,815 A | 10/1973 | Habock et al. | |
| 3,793,905 A | 2/1974 | Black et al. | |
| 3,898,439 A | 8/1975 | Reed et al. | |
| 3,951,008 A | 4/1976 | Schneider et al. | |
| 4,044,550 A | 8/1977 | Vermilye | |
| 4,069,424 A | 1/1978 | Burkett | |
| 4,144,421 A | 3/1979 | Sakai | |
| 4,380,146 A | 4/1983 | Yannone et al. | |
| 4,598,551 A | 7/1986 | Dimitroff, Jr. et al. | |
| 4,608,820 A | 9/1986 | White et al. | |
| 4,627,234 A | 12/1986 | Schuh | |
| 4,713,985 A | 12/1987 | Ando | |
| 4,733,529 A | 3/1988 | Nelson et al. | |
| 4,854,120 A | 8/1989 | Nelson et al. | |
| 4,979,362 A | 12/1990 | Vershure, Jr. | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 6,146,090 A | 11/2000 | Schmidt | |
| 6,168,377 B1 | 1/2001 | Wolfe et al. | |
| 6,190,127 B1 | 2/2001 | Schmidt | |
| 6,318,958 B1 | 11/2001 | Giesler et al. | |
| 6,353,790 B1 | 3/2002 | Tsuzuki | |
| 6,439,504 B1* | 8/2002 | Ahrendt ................... F02K 1/763 239/265.19 | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 6,943,699 B2* | 9/2005 | Ziarno ................... B64D 29/00 340/945 | |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,770,913 B1 | 7/2014 | Negron et al. | |
| 8,776,530 B2 | 7/2014 | Shirooni et al. | |
| 8,820,046 B2 | 9/2014 | Ross et al. | |
| 8,918,264 B2 | 12/2014 | Jegu et al. | |
| 8,979,705 B2* | 3/2015 | Galivel ................... F01D 15/10 477/15 | |
| 9,086,018 B2 | 7/2015 | Winston et al. | |
| 9,121,309 B2* | 9/2015 | Geiger ................... F01D 21/06 | |
| 9,394,084 B1* | 7/2016 | Edwards ............. H02P 29/0243 | |
| 9,664,070 B1 | 5/2017 | Clauson et al. | |
| 2003/0056492 A1 | 3/2003 | Henson | |
| 2003/0056494 A1 | 3/2003 | Coleman | |
| 2004/0131138 A1 | 7/2004 | Correia et al. | |
| 2005/0284214 A1 | 12/2005 | Gustafson et al. | |
| 2006/0188372 A1 | 8/2006 | Hansen | |
| 2008/0211237 A1* | 9/2008 | Berenger .................. H02J 3/12 290/40 B | |
| 2009/0071442 A1 | 3/2009 | Emo et al. | |
| 2009/0301053 A1 | 12/2009 | Geiger | |
| 2010/0095791 A1 | 4/2010 | Galloway | |
| 2010/0132365 A1 | 6/2010 | Labala | |
| 2010/0293961 A1 | 11/2010 | Tong et al. | |
| 2011/0077783 A1 | 3/2011 | Karpman et al. | |
| 2011/0138816 A1 | 6/2011 | Takeda et al. | |
| 2011/0146276 A1 | 6/2011 | Sathyanarayana et al. | |
| 2011/0153295 A1 | 6/2011 | Yerramalla et al. | |
| 2011/0232294 A1 | 9/2011 | Ross et al. | |
| 2011/0296843 A1 | 12/2011 | Lawson, Jr. | |
| 2012/0240591 A1 | 9/2012 | Snider et al. | |
| 2012/0266601 A1 | 10/2012 | Miller | |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0251501 A1 | 9/2013 | Araki et al. | |
| 2013/0255220 A1 | 10/2013 | Mathews, Jr. et al. | |
| 2014/0123673 A1 | 5/2014 | Mouze et al. | |
| 2014/0199157 A1 | 7/2014 | Haerms et al. | |
| 2014/0241878 A1 | 8/2014 | Herrig et al. | |
| 2014/0260306 A1 | 9/2014 | Dooley et al. | |
| 2014/0271152 A1 | 9/2014 | Rodriguez | |
| 2014/0301820 A1 | 10/2014 | Lohse et al. | |
| 2014/0318144 A1* | 10/2014 | Lazzeri ................... F01D 21/00 60/772 | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0016949 A1 | 1/2015 | Smith | |
| 2015/0115608 A1 | 4/2015 | Draper | |
| 2015/0121874 A1 | 5/2015 | Yoshida et al. | |
| 2015/0128592 A1 | 5/2015 | Filiputti et al. | |
| 2015/0159625 A1 | 6/2015 | Hawdwicke, Jr. et al. | |
| 2016/0348588 A1 | 12/2016 | Ross et al. | |
| 2017/0234235 A1 | 8/2017 | Pech | |
| 2017/0342855 A1 | 11/2017 | Hon et al. | |
| 2017/0363012 A1 | 12/2017 | Clauson et al. | |
| 2018/0010522 A1 | 1/2018 | Harder et al. | |

FOREIGN PATENT DOCUMENTS

| | | |
|---|---|---|
| FR | 2933131 | 1/2010 |
| GB | 1374810 | 11/1974 |
| GB | 2117842 | 10/1983 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |

(56) References Cited

FOREIGN PATENT DOCUMENTS

| WO | 2016069303 A1 | 5/2016 | | |
|---|---|---|---|---|
| WO | WO-2016069303 A1 | * | 5/2016 | ............. F01D 15/10 |

OTHER PUBLICATIONS

EP Application No. 17158502.9 Extended EP Search Report dated Jul. 20, 2017, 9 pages.

* cited by examiner

LOW-POWER BOWED ROTOR PREVENTION SYSTEM

CROSS-REFERENCE TO RELATED APPLICATIONS

This patent application claims priority to U.S. Provisional Application No. 62/301,163, filed Feb. 29, 2016, which is incorporated herein by reference in its entirety.

BACKGROUND

This disclosure relates to gas turbine engines, and more particularly to a bowed rotor prevention system.

Gas turbine engines are used in numerous applications, one of which is for providing thrust to an aircraft. When a gas turbine engine of an aircraft has been shut off for example, after an aircraft has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for preventing a "bowed rotor" condition.

BRIEF DESCRIPTION

In one embodiment, a bowed rotor prevention system for a gas turbine engine includes a core turning motor operable to drive rotation of an engine core of the gas turbine engine. The bowed rotor prevention system also includes an auxiliary electric motor control operable to control the core turning motor to drive rotation of the engine core using electric power while a full authority digital engine control (FADEC) that controls operation of the gas turbine engine is either depowered or in a power state that is less than a power level used by the FADEC in flight operation.

In addition to one or more of the features described above, or as an alternative to any of the foregoing embodiments, further embodiments may include a switch interposed between the auxiliary electric motor control and an electric power source that provides the aircraft power, where the core turning motor is an electric motor and the auxiliary electric motor control is operable to control a flow of electric current between the electric power source and the core turning motor based on a state of the switch.

In addition to one or more of the features described above, or as an alternative to any of the foregoing embodiments, further embodiments may include where the FADEC is operable to enable the auxiliary electric motor control based on detecting an engine shutdown condition of the gas turbine engine.

In addition to one or more of the features described above, or as an alternative to any of the foregoing embodiments, further embodiments may include where the FADEC delays enabling of the auxiliary electric motor control after detecting the engine shutdown condition.

In addition to one or more of the features described above, or as an alternative to any of the foregoing embodiments, further embodiments may include where the core turning motor is mechanically linked through a transmission system to the engine core.

In addition to one or more of the features described above, or as an alternative to any of the foregoing embodiments, further embodiments may include where the transmission system includes a gear train and a back-drive preventer.

In addition to one or more of the features described above, or as an alternative to any of the foregoing embodiments, further embodiments may include where a gear reduction through the transmission system and the core turning motor is greater than 100:1.

In addition to one or more of the features described above, or as an alternative to any of the foregoing embodiments, further embodiments may include where the core turning motor is capable of a continuous stall torque and continuous free run.

In addition to one or more of the features described above, or as an alternative to any of the foregoing embodiments, further embodiments may include where the auxiliary electric motor control is operable to monitor an operational status of the core turning motor and report a success status to the FADEC.

In addition to one or more of the features described above, or as an alternative to any of the foregoing embodiments, further embodiments may include where the auxiliary electric motor control is operable to control the core turning motor to drive rotation of the engine core at a substantially constant speed for a timed duration.

In addition to one or more of the features described above, or as an alternative to any of the foregoing embodiments, further embodiments may include where the substantially constant speed is about 0.1 revolutions per minute.

In addition to one or more of the features described above, or as an alternative to any of the foregoing embodiments, further embodiments may include where the engine core is a high spool of the gas turbine engine.

In addition to one or more of the features described above, or as an alternative to any of the foregoing embodiments, further embodiments may include where the auxiliary electric motor control is in a physically separate enclosure as the FADEC.

In addition to one or more of the features described above, or as an alternative to any of the foregoing embodiments, further embodiments may include where the auxiliary electric motor control is located within a FADEC chassis shared by a plurality of resources of the FADEC.

In addition to one or more of the features described above, or as an alternative to any of the foregoing embodiments, further embodiments may include where the auxiliary electric motor control and the core turning motor consume less than 500 watts while driving rotation of the engine core.

In addition to one or more of the features described above, or as an alternative to any of the foregoing embodiments, further embodiments may include where the auxiliary electric motor control and the core turning motor consume about 40 watts while driving rotation of the engine core.

In addition to one or more of the features described above, or as an alternative to any of the foregoing embodiments, further embodiments may include where the FADEC is operable to perform a dry motoring process based on the auxiliary electric motor control indicating that a bowed rotor prevention process was not successfully completed.

In addition to one or more of the features described above, or as an alternative to any of the foregoing embodiments, further embodiments may include where the core turning motor is shut down based on one or more of: a detected opening of a nacelle of the gas turbine engine, a shutoff switch accessible to maintenance personnel on the nacelle or the gas turbine engine, a computer interface command on the aircraft, a detected fault condition, a time limit, a temperature limit, or a start command of the gas turbine engine.

A technical effect of the apparatus, systems and methods is achieved by using a bowed rotor prevention and start sequence for a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
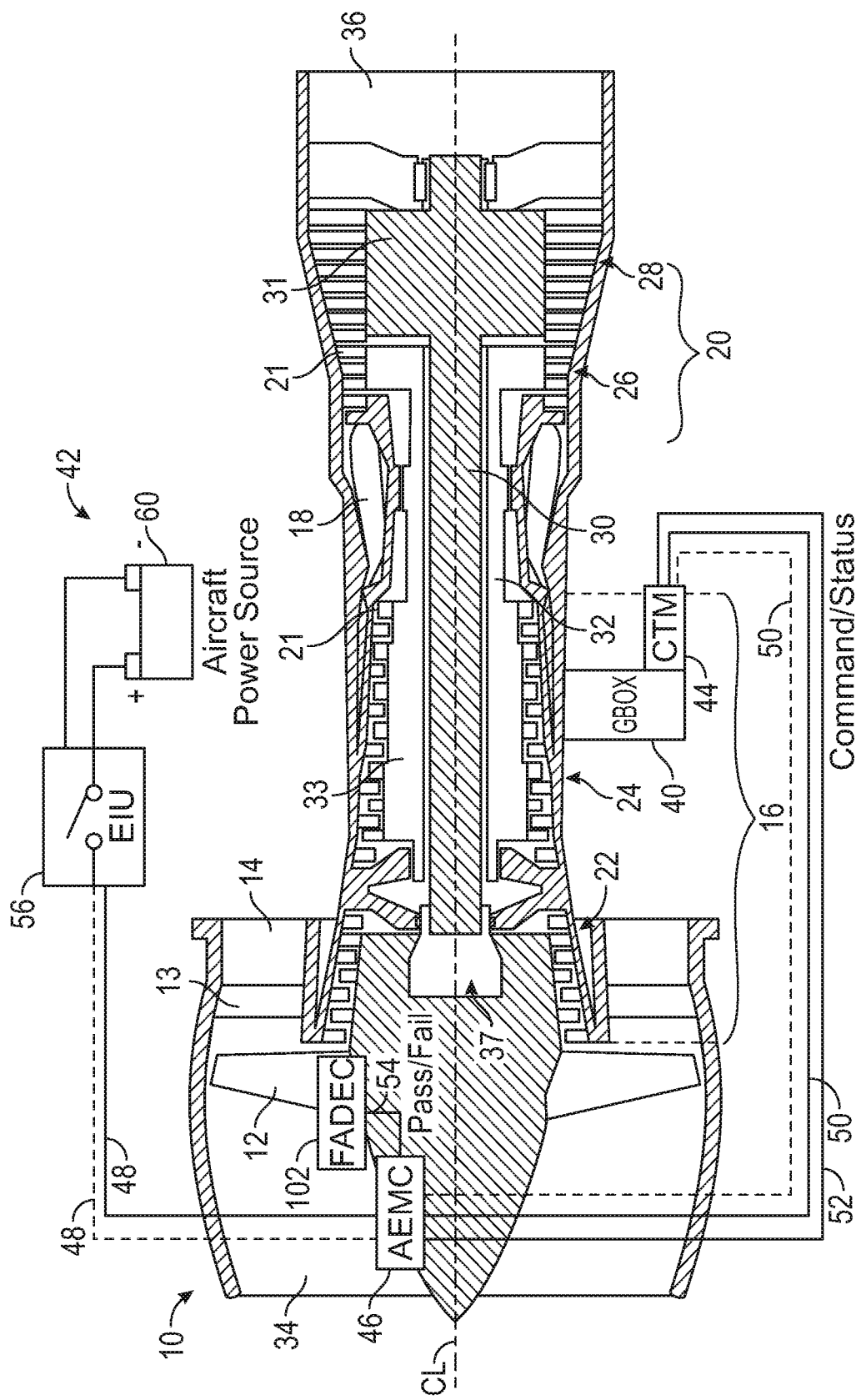
FIG. 1 is a cross-sectional view of a gas turbine engine including a bowed rotor prevention system.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to bowed rotor prevention in a gas turbine engine. Embodiments prevent a bowed rotor condition by using a core turning motor to drive rotation of the gas turbine engine under low power conditions. Embodiments use an auxiliary electric motor control (AEMC) to drive a core turning motor (CTM) to prevent a bowed rotor condition of the gas turbine engine based on aircraft power. The AEMC can isolate power requirements from a full authority digital engine control (FADEC) that controls operation of the gas turbine engine, such that the FADEC need not be fully operational and powered while the AEMC controls the CTM. The AEMC can be operable to monitor the duration of engine core rotation and report a pass/fail status, for instance, upon a subsequent engine start process performed by the FADEC. Embodiments consume less than 500 watts of power by the AEMC and the CTM combined while performing core turning (i.e., bowed rotor prevention is active). In some embodiments, the AEMC and CTM combine for about 40 watts of power draw while core turning is active. Thus, whether the aircraft power source is a battery, ground power, or other source of electrical power, the power consumption is reduced as compared to using full FADEC capabilities that are typically available during normal operation (e.g., in flight operation) of the gas turbine engine.

Aircraft power can be selectively provided through an engine interface unit (EIU) as switched power for both the AEMC and the CTM. The EIU and/or other switch locations, such as the nacelle, can depower the CTM, for instance, to perform maintenance actions.

In some embodiments, the FADEC can drive a discrete output (e.g., a 28 volt output) for bowed rotor prevention by the AEMC at shutdown. The FADEC may directly control power to the AEMC and/or send a switching request to one or more other systems to enable the AEMC. The FADEC may remain powered for a predetermined period of time (e.g., 10 minutes) after engine fuel has been cutoff before enabling the AEMC. The AEMC can drive the CTM to rotate an engine core (e.g., starting spool/N2) of the gas turbine engine at about 0.1 revolutions per minute (RPM) with a gear reduction (e.g., greater than 100:1) by applying substantially constant power (i.e., not periodic) for a period of time. The CTM can include a feedback device, depending on the type of motor selected, to monitor electric current, back electromotive force, torque, and/or other parameters. The AEMC can also provide a pass/fail (e.g., successful/unsuccessful bowed rotor prevention process) status that is readable by the FADEC, for instance, as a discrete input to the FADEC. If the AEMC indicates a pass status, the FADEC may continue with normal engine starting operation; otherwise, the FADEC may attempt to use alternate techniques to mitigate a bowed rotor condition, such as dry motoring. Dry motoring can also be used if the engine is started before the CTM is shutdown. For instance, if it is determined that the CTM has not been run for a sufficient period of time to prevent a bowed rotor condition, dry motoring can be used. In some embodiments, if CTM is restarted and runs for a predetermined period of time, then dry motoring can be canceled/inhibited during engine starting.

During a dry motoring process, a starter valve can be actively adjusted to deliver air pressure from an air supply to an engine starting system that controls starting rotor speed. Dry motoring may be performed by running an engine starting system at a lower speed with a longer duration than typically used for engine starting while dynamically adjusting the starter valve to maintain the rotor speed and/or follow a dry motoring profile. Dry motoring is typically performed at a higher speed than bowed rotor prevention performed by the CTM. Some embodiments increase the rotor speed of the starting spool to approach a critical rotor speed gradually and as thermal distortion is decreased the starting spool then accelerates beyond the critical rotor speed to complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A bowed rotor prevention system including the CTM can also include a back-drive preventer (e.g., an overrunning clutch) to isolate the CTM from other sources of driving rotation of the gas turbine engine. The CTM can drive rotation of the gas turbine engine through an accessory gearbox or other gear train as part of a transmission system. As one example, the CTM is on a starter of the gas turbine engine and drives a starter gear set through a tower shaft to slowly rotate a starting spool of the gas turbine engine. The CTM may be capable of continuous stall torque as well as continuous free running in the case of CTM shaft shear and/or other failure modes. If core rotation fails or the AEMC is depowered for a predetermined timeout period (e.g., > two minutes), the pass/fail status from the AEMC can be set to indicate the failure, for instance, by setting the discrete to ground/zero volts. Alternatively or additionally the status of the AEMC can be sent to one or more other systems, such as an aircraft maintenance computer system.

The AEMC can shut down the CTM based on elapsed motoring time and/or a measured temperature. The AEMC can be implemented as a separate line replaceable unit (LRU) as the FADEC or can be a circuit/card/module within a same chassis as the FADEC or other box that is energized while primary functionality of the FADEC is depowered or in a low-power state.

The CTM can rotate turbomachinery of the gas turbine engine at very low speed (e.g., <5 revolutions per minute (RPM)) in order to equalize the thermal gradient of the rotating parts after engine shutdown. The core turning motor can interface through any of the gear-driven accessories of the engine, such as an air turbine starter or a crank pad location. The power requirements of the core turning motor are substantially reduced in that the rotation needed to equalize the thermal gradients may be on the order of less than 3 RPM. Upon engine shutdown, the core turning motor can be controlled to rotate the turbomachinery, e.g., a high pressure spool of the gas turbine engine, for a predetermined period of time (30-40 minutes, for example). By slow and/or periodic rotation of the turbomachinery, the thermal gradient is avoided, and thus a bow condition is prevented/eliminated.

Embodiments avoid high speed rotation (e.g., 5000-7000 RPM) of the engine after shutdown and also avoid requiring a flight crew to monitor the temperature of each engine of a multi-engine aircraft for several minutes prior to restarting each engine. Rather than using a ground cart or other external source to drive engine rotation (e.g., an external pneumatic system) or an auxiliary power unit of the aircraft that is typically used to rotate turbomachinery of the engine at a starting speed, embodiments use an electric motor as the core turning motor operable to slowly rotate (e.g., <5 RPM) the turbomachinery after engine shutdown. Embodiments of the core turning motor can be dedicated for use in bowed rotor prevention, and as such, sized with a lower weight and volume than would be needed to drive rotation of the engine at or above an engine starting speed. Gear reductions can be used to reduce electric power consumption.

Various embodiments of this disclosure may be applied on any turbomachinery component that requires cooling after shutdown. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 may be subject to deflection or bowing if a thermal gradient forms after engine shutdown.

In the two-spool, high bypass configuration of FIG. 1, compressor section 16 includes a low pressure compressor 22 and a high pressure compressor 24. The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33 (also referred to as a starting spool).

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, the low pressure shaft 30 may be coupled to fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

In embodiments, an engine accessory gearbox 40 is mechanically coupled to a rotating portion of the gas turbine engine 10, such as the high pressure spool 33 (e.g., an engine core component). Rotation of various engine accessories can be driven through the engine accessory gearbox 40, such as pumps and electric generators. In embodiments, a core turning motor 44 is coupled through the engine accessory gearbox 40 as part of a bowed rotor prevention system 42 and may be integrally formed with an engine accessory, such as a starter. The bowed rotor prevention system 42 also includes an auxiliary electric motor control (AEMC) 46 to drive the CTM 44 to prevent a bowed rotor condition of the gas turbine engine 10 based on aircraft power from aircraft power source 60. The AEMC 46 can isolate power requirements from a full authority digital engine control (FADEC) 102 that controls operation of the gas turbine engine 10. A switch 56 is interposed between the AEMC 46 and the aircraft power source 60. Switched power can be provided on a power bus 48 to AEMC 46, where the AEMC 46 may regulate and/or condition power provided on power bus 50 to the CTM 44. The AEMC 46 can provide commands and retrieve status from the CTM 44 via motor interface 52. A discrete interface 54 between the AEMC 46 and FADEC 102 can provide pass/fail status to indicate whether the AEMC 46 was able to successfully complete a bowed rotor prevention process using the CTM 44. The FADEC 102 and/or the AEMC 46 can set a maintenance flag if the AEMC 46 detects that the CTM 44 did not turn when commanded. If the FADEC 102 determines that the CTM 44 did not turn or the AEMC 46 was otherwise unsuccessful at completing bowed rotor prevention using the CTM 44, the FADEC 102 can perform a dry motoring process to mitigate potential bowed rotor conditions.

In an embodiment, the core turning motor 44 is incapable of driving rotation of the gas turbine engine 10 of FIG. 1 at a sufficient speed to start combustion within the gas turbine engine 10. In an embodiment, the core turning motor 44 drives rotation the gas turbine engine 10 at less than 10 RPM and may be incapable of producing sufficient horsepower to reach higher speeds when driving engine rotation. The AEMC 46 is operable to control a flow of electric current from the aircraft power source 60 to the core turning motor 44. The AEMC 46 is operable to engage the core turning motor 44 based on an engine shutdown condition of the gas turbine engine 10 of FIG. 1. For example, the FADEC 102 may detect an engine shutdown condition of the gas turbine engine 10 of FIG. 1 and enable operation of the AEMC 46 prior to depowering of the FADEC 102. Alternatively, the AEMC 46 can be enabled by another source, such as a sensor, an aircraft communication bus, a discrete switch, or the like. The AEMC 46 may also monitor the aircraft power source 60 and/or back electromotive force of the core turning motor 44 as part of a monitoring process to confirm proper system operation and capability.

The FADEC 102 and/or the AEMC 46 may include memory to store instructions that are executed by a processor. The executable instructions may be stored or organized in any manner and at any level of abstraction, such as in connection with a controlling and/or monitoring operation of one or more systems of the gas turbine engine 10 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The AEMC 46 can be embodied in an individual line-replaceable unit, within a control system (e.g., in an electronic engine control), and/or distributed between multiple electronic systems. Alternatively, the AEMC 46 may be implemented without software, e.g., as an analog system.

Figure 2:
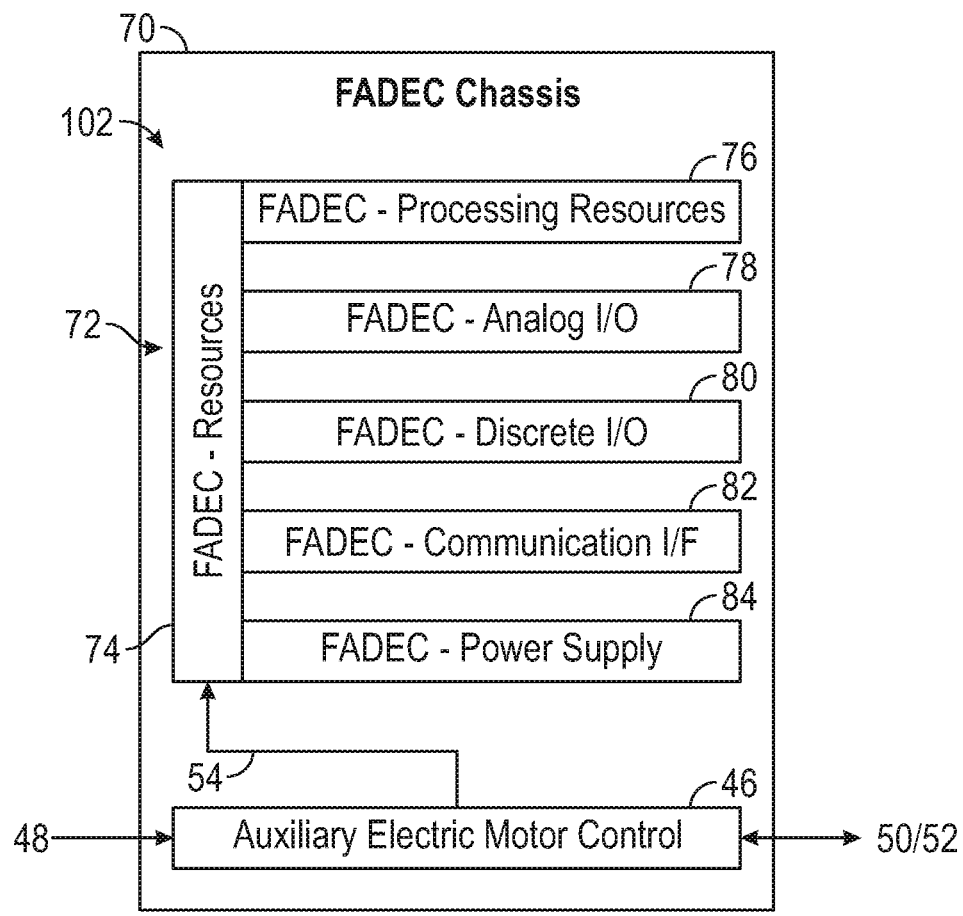
FIG. 2 is a block diagram of a control system according to an embodiment of the disclosure.

In an embodiment as depicted in FIG. 2, a FADEC chassis 70 can hold one or more channels 72 of FADEC 102, where each channel 72 includes a plurality of FADEC resources 74 such as FADEC processing resources 76, FADEC analog I/O 78, FADEC discrete I/O 80, FADEC communications interface 82, FADEC power supply 84, and/or other resources (not depicted). The FADEC chassis 70 can also hold the AEMC 46 as a card/circuit/module that is separately powered from the FADEC resources 74. Status input on discrete interface 54 is provided from the AEMC 46 to one or more of the FADEC resources 74 such as the FADEC discrete I/O 80. Once the AEMC 46 receives power on power bus 50 during a bowed rotor prevention process, FADEC resources 74 can be depowered to reduce total power consumption.

Figure 3:
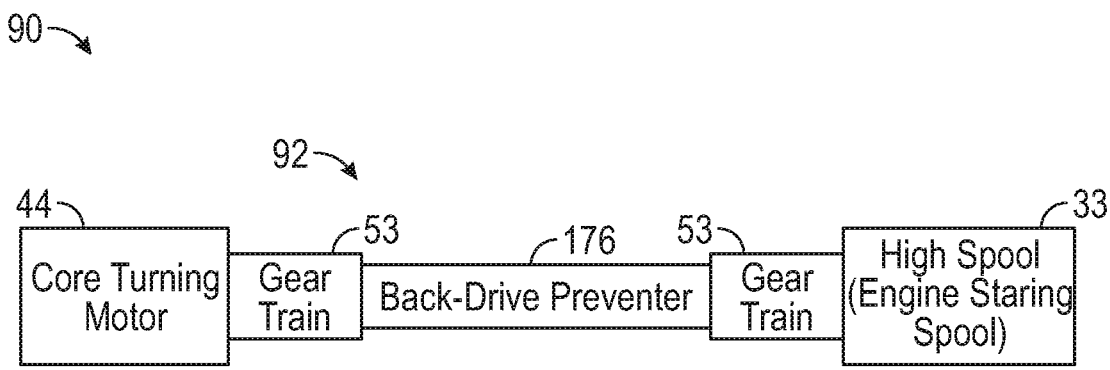
FIG. 3 is a block diagram of a core turning motor system according to an embodiment of the disclosure.

FIG. 3 depicts a core turning motor system 90 as including the CTM 44, a transmission system 92, and the high spool (engine starting spool) 33. The transmission system 92 can include a gear train 53 and a back-drive preventer 176 (e.g., a one-way clutch). The gear train 53 can be distributed through a number of shafts (e.g., a tower shaft), gear sets, gear boxes (e.g., an accessory gear box), and/or other transmission components.

Figure 4:
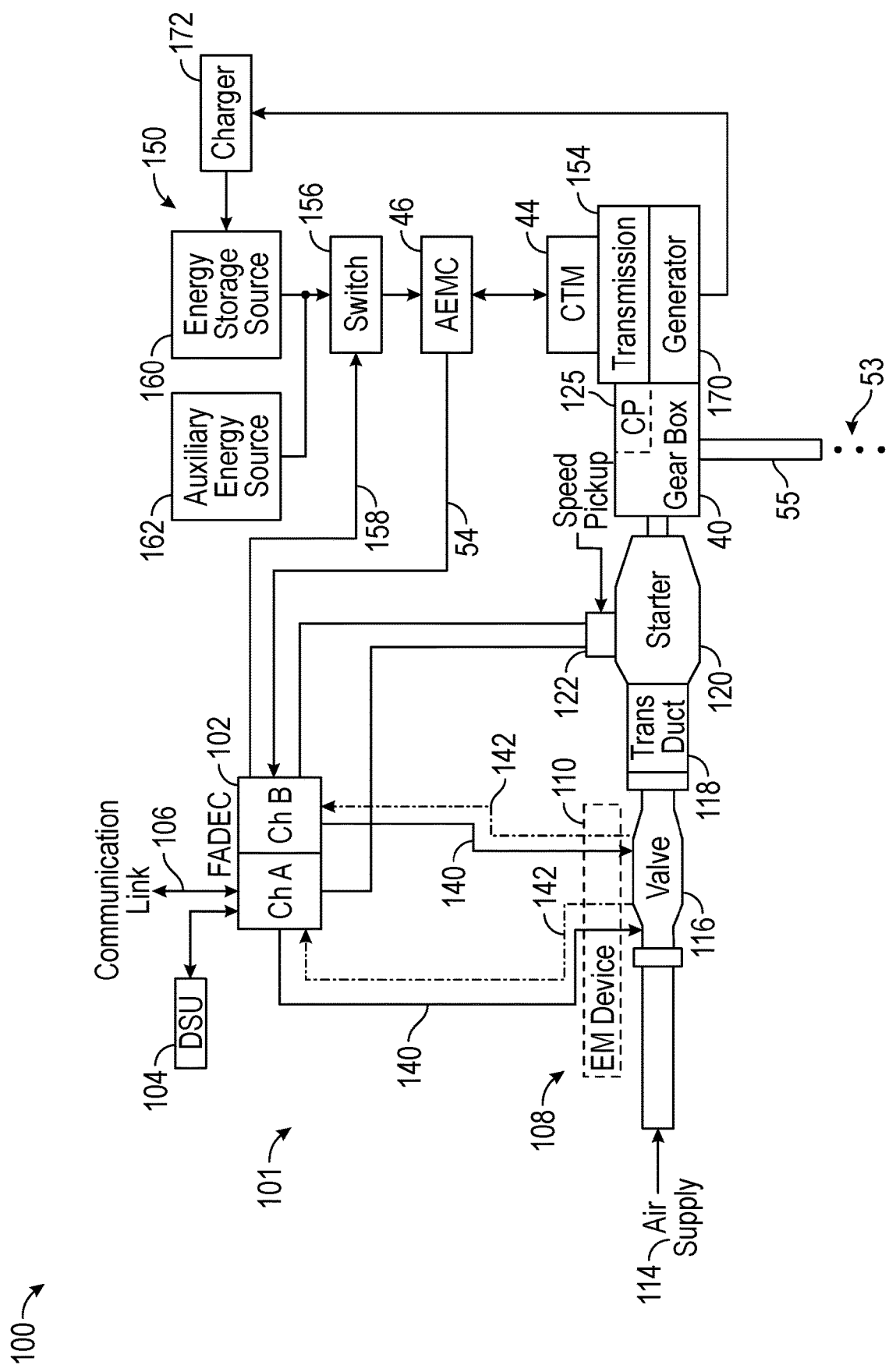
FIG. 4 is a block diagram of a bowed rotor prevention system according to an embodiment of the disclosure.

Turning now to FIG. 4, a schematic of a starting system 100 for the gas turbine engine 10 of FIG. 1 is depicted according to an embodiment. The starting system 100 is also referred to generally as a gas turbine engine system and can include components of the bowed rotor prevention system 42 of FIG. 1 along with additional components or variations thereof. In the example of FIG. 4, the starting system 100 includes FADEC 102, which may be a dual channel controller. The starting system 100 can also include a data storage unit (DSU) 104 that retains data between shutdowns of the gas turbine engine 10 of FIG. 1. The DSU 104 includes non-volatile memory and retains data between cycling of power to the FADEC 102 and DSU 104. A communication link 106 can include an aircraft and/or test stand communication bus to interface with aircraft controls, e.g., a cockpit, various onboard computer systems, and/or a test stand.

A dry motoring system 108 is operable to drive rotation of a starting spool (e.g., high spool 33) of the gas turbine engine 10 of FIG. 1. Either or both channels of FADEC 102 can alternate on and off commands to an electromechanical device 110 which may be coupled to a starter valve 116 to achieve a partially open position of the starter valve 116 to control a flow from a starter air supply 114 (also referred to as air supply 114) through a transfer duct 118 to an air turbine starter 120 (also referred to as starter 120 or pneumatic starter motor 120) to drive rotation of a starting spool of the gas turbine engine 10 below an engine idle speed. The air supply 114 (also referred to as starter air supply 114) can be provided by any known source of compressed air, such as an auxiliary power unit or ground cart.

The FADEC 102 can monitor a speed sensor, such as speed pickup 122 that may sense the speed of the engine rotor through its connection to gearbox 40 which is in turn connected to the high spool 33 via tower shaft 55 through gear train 53 (e.g., rotational speed of high spool 33) or any other such sensor for detecting or determining the speed of the gas turbine engine 10 of FIG. 1. The starter 120 may be coupled to the gearbox 40 of the gas turbine engine 10 of FIG. 1 directly or through a transmission such as a clutch system. The FADEC 102 can establish a control loop with respect to rotor speed to adjust positioning of the starter valve 116.

The starter valve 116 may be designed as an on/off valve which is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The FADEC 102 can modulate the on and off commands (e.g., as a duty cycle using pulse width modulation) to the electromechanical device 110 to further open the starter valve 116 and increase a rotational speed of the starting spool of the gas turbine engine 10 of FIG. 1. In an embodiment, the electromechanical device 110 has a cycle time defined between an off-command to an on-command to the off-command that is at most half of a movement time for the starter valve 116 to transition from fully closed to fully open. Pneumatic lines or a mechanical linkage (e.g., via valve control 140) can be used to drive the starter valve 116 between the open position and the closed position. The electromechanical device 110 can be a solenoid that positions the starter valve 116 based on intermittently supplied electric power as commanded by the FADEC 102. In an alternate embodiment, the electromechanical device 110 is an electric valve controlling muscle air to adjust the position of the starter valve 116 as commanded by the FADEC 102.

Rather than using an electromechanical device 110 coupled to the starter valve 116 to achieve a partially open position of the starter valve 116, the dry motoring system 108 can uses a variable position starter valve as the starter valve 116. Either or both channels of FADEC 102 can output a valve control signal 140 operable to dynamically adjust a valve angle of the starter valve 116 that selectively allows a portion of the air supply 114 to pass through the starter valve 116 and transfer duct 118 to air turbine starter 120. The starter valve 116 can be a continuous/infinitely adjustable valve that can hold a commanded valve angle, which may be expressed in terms of a percentage open/closed and/or an angular value (e.g., degrees or radians). Performance parameters of the starter valve 116 can be selected to meet dynamic response requirements of the starting system 100. For example, in some embodiments, the starter valve 116 has a response rate of 0% to 100% open in less than 40 seconds. In other embodiments, the starter valve 116 has a response rate of 0% to 100% open in less than 30 seconds. In further embodiments, the starter valve 116 has a response rate of 0% to 100% open in less than 20 seconds.

In some embodiments, the FADEC 102 can monitor a valve angle of the starter valve 116 using valve angle feedback signals 142 provided to both channels of FADEC 102. As one example, in an active/standby configuration, both channels of the FADEC 102 can use the valve angle feedback signals 142 to track a current valve angle, while only one channel designated as an active channel outputs valve control signal 140. Upon a failure of the active channel, the standby channel of FADEC 102 can take over as the active channel to output valve control signal 140. In an alternate embodiment, both channels of FADEC 102 output all or a portion of a valve angle command simultaneously on the valve control signals 140. The FADEC 102 can establish an outer control loop with respect to rotor speed and an inner control loop with respect to the valve angle of the starter valve 116.

When needed, dry motoring can be performed according to one or more processes as described in U.S. patent application Ser. No. 15/042,794, which is incorporated by reference herein in its entirety.

The starting system 100 also include a core-turning motoring system 150 (also referred to as an auxiliary drive system) that includes CTM 44 that is operable to drive rotation of the starting spool (e.g., high spool 33) of the gas turbine engine 10 of FIG. 1 through gearbox 40. A transmission 154 (which can be part of transmission system 92 of FIG. 3) may be interposed between the CTM 44 and the gearbox 40 for reduction gearing and/or a clutch (e.g., inclusion of the back-drive preventer 176 of FIG. 3). The transmission 154 can interface with the gearbox 40 at a manual crank pad 125 location. In alternate embodiments, the transmission 154 interfaces with an alternate portion of the gearbox 40, and/or the transmission 154 is integrally formed with the gearbox 40. The core-turning motoring system 150 also includes a switch 156 that may be commanded by either or both channels of the FADEC 102 (e.g., using an enable signal 158) to provide electrical power to the AEMC 46. According to various embodiments, the switch 156 may be a mechanical switch, electrical relay, or other mechanism for controlling the distribution of electrical power to the core-turning motoring system 150. The switch 156 may be an embodiment of switch 56 of FIG. 1 or an additional switch. Electrical power may be provided from an energy storage source 160 and/or an auxiliary energy source 162, such as ground power or other aircraft/external source, as embodiments of the aircraft power source 60 of FIG. 1, which is also generally referred to as an electric power source. The energy storage source 160 can be a battery or capacitor of an aircraft electrical system, which may be charged by a generator 170 through a charger 172. The generator 170 may be driven by the gearbox 40 (e.g., during operation of the gas turbine engine 10) or other source of rotational energy on the aircraft. Examples of the generator 170 include a permanent magnet alternator/generator, an integrated drive generator, a variable frequency generator, and other generator technologies known in the art.

In various embodiments, the core-turning motoring system 150 or the dry motoring system 108 can be used to prevent/mitigate a bowed rotor condition depending on the present operating characteristics of the gas turbine engine 10 of FIG. 1. The FADEC 102 in combination with the dry motoring system 108 and the core-turning motoring system 150 may be collectively referred to as a bowed rotor prevention system 101 that is operable to prevent and/or mitigate a bowed rotor condition of the gas turbine engine 10 of FIG. 1. In an embodiment, the FADEC 102 is operable to engage the CTM 44 and drive rotation of the engine core of the gas turbine engine 10 of FIG. 1. Once enabled, the AEMC 46 may drive rotation of the CTM 44 until a time or temperature threshold is met or a shutoff request is detected based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10 of FIG. 1.

Figure 5:
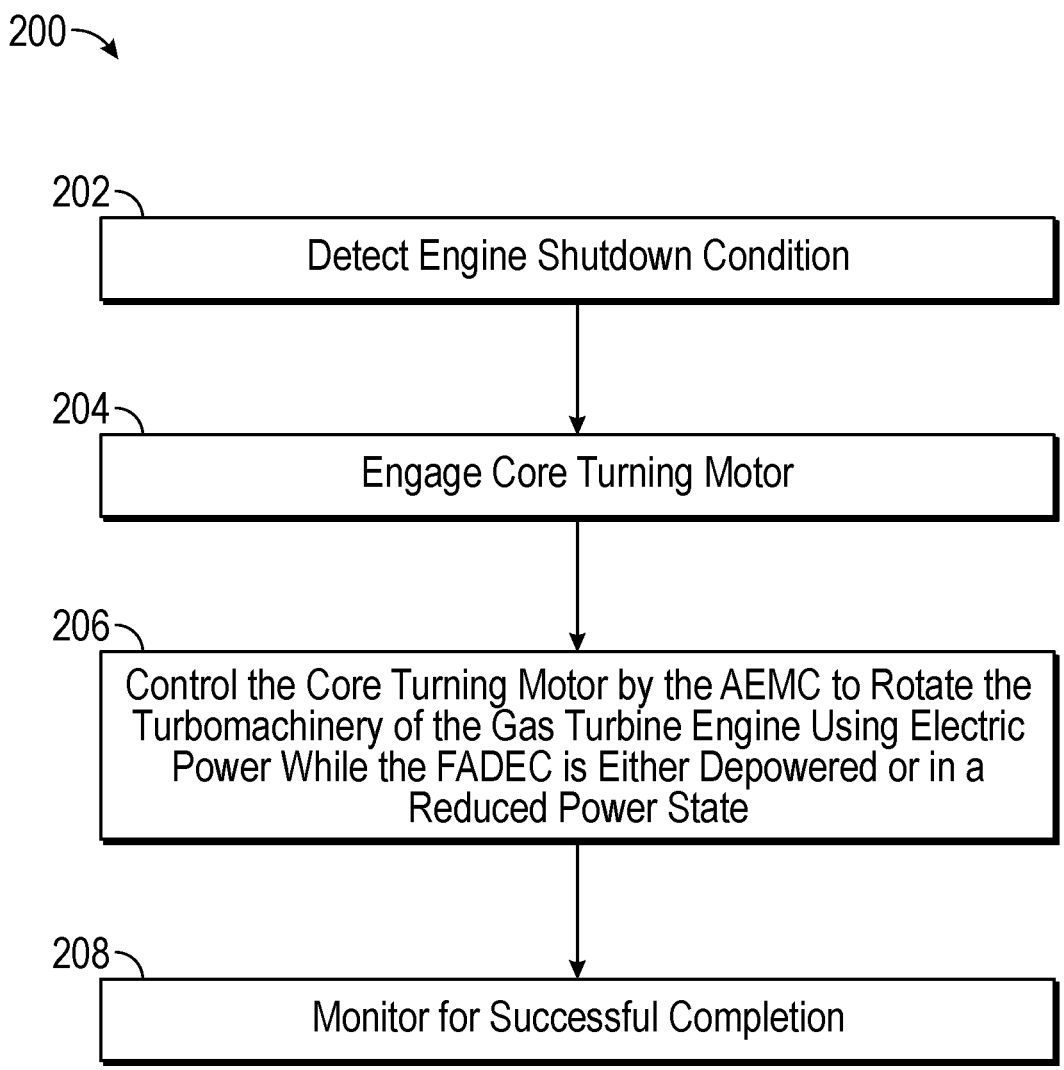
FIG. 5 is a process flow of a method according to embodiments of the disclosure.

FIG. 5 is a process flow of a method 200 according to an embodiment. The method 200 can be implemented by the bowed rotor prevention system 42 of FIG. 1 and/or bowed rotor prevention system 101 of FIG. 4, and thus FIG. 5 is described with reference to FIGS. 1-5. At block 202, an engine shutdown condition of the gas turbine engine 10 is detected, for instance, by the FADEC 102. After a confirmation period of time elapses, the FADEC 102 can trigger the AEMC 46 to perform bowed rotor prevention. At block 204, the AEMC 46 engages the core turning motor 44 with turbomachinery of the gas turbine engine 10, for instance, through the engine accessory gearbox 40 by enabling a flow of electric current on the power bus 50 as provided by the aircraft power source 60. At block 206, the AEMC 46 controls the core turning motor 44 to rotate the turbomachinery of the gas turbine engine 10 using electric power while the FADEC 102 that controls operation of the gas turbine engine 10 is either depowered or in a power state that is less than a power level used by the FADEC 102 in flight operation (i.e., a reduced power state). The core turning motor 44 rotates turbomachinery of the gas turbine engine 10 at a low speed (e.g., <5 RPM) until a bowed rotor prevention threshold condition is met (e.g., a targeted time and/or temperature condition is met). Rotation may be substantially constant at about 0.1 RPM. At block 208, the AEMC 46 monitors for successful completion of the bowed rotor prevention process and makes the results available to the FADEC 102. If needed, the FADEC 102 can perform a dry motoring process on start-up when the AEMC 46 indicates that the bowed rotor prevention process was not successful.

Technical effects and benefits include using a core turning motor to slowly rotate turbomachinery of a gas turbine engine after shutdown to equalize a thermal gradient of rotating parts that were heated during operation. Using a separate control function and a lower power electric motor with gear reduction provides reduced power consumption during bowed rotor prevention processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor prevention system for a gas turbine engine, the bowed rotor prevention system comprising:
   a core turning motor configured to drive rotation of an engine core of the gas turbine engine; and
   an auxiliary electric motor control configured to:
      control the core turning motor to drive rotation of the engine core using electric power while a full authority digital engine control (FADEC) that controls operation of the gas turbine engine is either depowered or in a power state that is less than a power level used by the FADEC in flight operation, and
      report a success status to the FADEC indicating whether a bowed rotor prevention process was successfully or unsuccessfully completed;
   wherein the FADEC is configured to perform a dry motoring process at start-up based on the report from the auxiliary electric motor control indicating that a bowed rotor prevention process was unsuccessfully completed using the core turning motor, the dry motoring process comprising actively adjusting a starter valve by the FADEC to deliver air pressure from an air supply to an air turbine starter that drives rotation of a starting spool of the engine core to a dry motoring speed that is lower than a starting speed.

2. The bowed rotor prevention system as in claim 1, further comprising a switch interposed between the auxiliary electric motor control and an electric power source that provides aircraft power, wherein the core turning motor is an electric motor and the auxiliary electric motor control is operable to control a flow of electric current between the electric power source and the core turning motor based on a state of the switch.

3. The bowed rotor prevention system as in claim 1, wherein the FADEC is operable to enable the auxiliary electric motor control based on detecting an engine shutdown condition of the gas turbine engine.

4. The bowed rotor prevention system as in claim 3 wherein the FADEC delays enabling of the auxiliary electric motor control after detecting the engine shutdown condition.

5. The bowed rotor prevention system as in claim 1, wherein the core turning motor is mechanically linked through a transmission system to the engine core.

6. The bowed rotor prevention system as in claim 5, wherein the transmission system comprises a gear train and a back-drive preventer.

7. The bowed rotor prevention system as in claim 1, wherein the core turning motor is capable of a continuous stall torque and continuous free run.

8. The bowed rotor prevention system as in claim 1, wherein the auxiliary electric motor control is operable to monitor an operational status of the core turning motor to report the success status to the FADEC.

9. The bowed rotor prevention system as in claim 1, wherein the auxiliary electric motor control is operable to control the core turning motor to drive rotation of the engine core at a constant speed for a timed duration.

10. The bowed rotor prevention system as in claim 9, wherein the constant speed is 0.1 revolutions per minute.

11. The bowed rotor prevention system as in claim 1, wherein the engine core is a high spool of the gas turbine engine.

12. The bowed rotor prevention system as in claim 1, wherein the auxiliary electric motor control is in a physically separate enclosure as the FADEC.

13. The bowed rotor prevention system as in claim 1, wherein the auxiliary electric motor control is located within a FADEC chassis shared by a plurality of resources of the FADEC.

14. The bowed rotor prevention system as in claim 1, wherein the auxiliary electric motor control and the core turning motor consume between 40 and 500 watts while driving rotation of the engine core.

15. The bowed rotor prevention system as in claim 1, wherein the auxiliary electric motor control and the core turning motor consume about 40 watts while driving rotation of the engine core.

16. The bowed rotor prevention system as in claim 1, wherein the core turning motor is shut down based on one or more of a detected opening of a nacelle of the gas turbine engine, a shutoff switch accessible to maintenance personnel on the nacelle of the gas turbine engine, a computer interface command on an aircraft, a detected fault condition, a time limit, a temperature limit, or a start command of the gas turbine engine.

17. A method of bowed rotor prevention for a gas turbine engine, the method comprising:
   engaging a core turning motor with turbomachinery of the gas turbine engine;
   controlling the core turning motor by an auxiliary electric motor control to rotate the turbomachinery of the gas turbine engine using electric power while a full authority digital engine control (FADEC) that controls operation of the gas turbine engine is either depowered or in a power state that is less than a power level used by the FADEC in flight operation;
   reporting a success status from the auxiliary electric motor control to the FADEC indicating whether a bowed rotor prevention process was successfully or unsuccessfully completed; and
   performing a dry motoring process by the FADEC at start-up based on the report from the auxiliary electric motor control indicating that a bowed rotor prevention process was unsuccessfully completed using the core turning motor, the dry motoring process comprising actively adjusting a starter valve by the FADEC to deliver air pressure from an air supply to an air turbine starter that drives rotation of a starting spool of the engine core to a dry motoring speed that is lower than a starting speed.

18. The method as in claim 17, wherein the core turning motor is an electric motor and the auxiliary electric motor control is operable to control a flow of electric current between an electric power source and the core turning motor based on a state of a switch interposed between the auxiliary electric motor control and the electric power source that provides aircraft power.

* * * * *